Inventor
Richard T. Glascodine
by Dean S. Edwards
Attorney

Dec. 10, 1940.  R. T. GLASCODINE  2,224,223
CONTROL DEVICE
Filed March 24, 1939  3 Sheets-Sheet 2

Inventor
Richard T. Glascodine
by
Dean S. Edmonds
Attorney

Dec. 10, 1940.    R. T. GLASCODINE    2,224,223
CONTROL DEVICE
Filed March 24, 1939    3 Sheets-Sheet 3
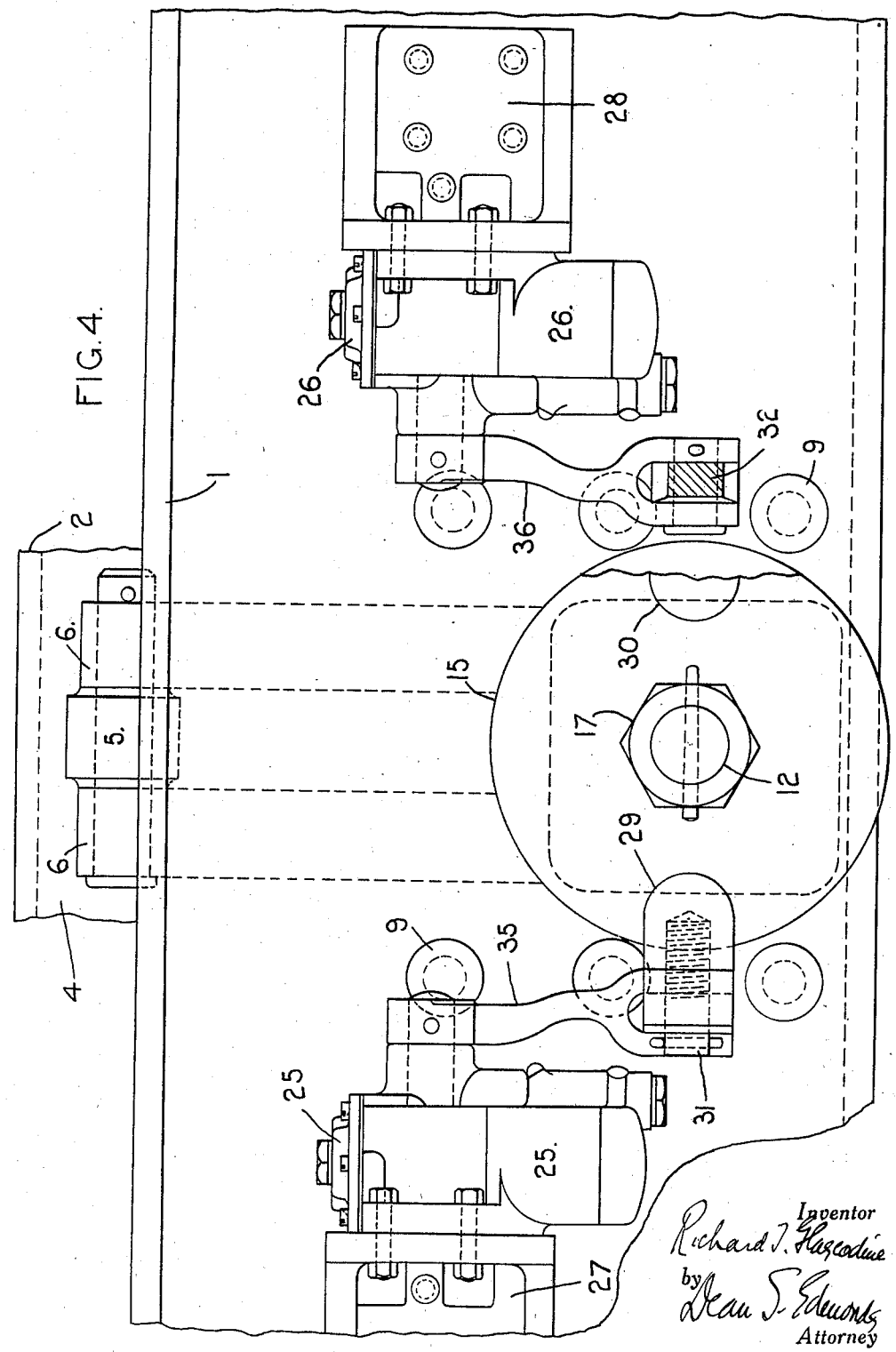
Inventor
Richard T. Glascodine
by Dean S. Edmonds
Attorney Patented Dec. 10, 1940

2,224,223

UNITED STATES PATENT OFFICE 2,224,223

CONTROL DEVICE

Richard Thomson Glascodine, Westminster, London, England

Application March 24, 1939, Serial No. 263,861
In Great Britain March 28, 1938

9 Claims. (Cl. 105—193)

This invention relates to vehicle constructions, and is concerned more particularly with a novel mounting for the body of a railway vehicle.

As now customarily constructed, the body of a railway vehicle, such as a passenger coach, is supported at each end by a bolster pivotally suspended from the truck frame on links usually inclined which permit limited lateral movement of the bolster, and with it the vehicle body, in relation to the truck frame, the inclination of the links causing the return of the bolster to its normal position. At the limit of this movement it has been customary to furnish rubber stops or abutments preventing metal to metal contact. With the recent increase in speed of rail vehicles, however, this construction has proved inadequate to insure comfortable riding particularly when the vehicles round curves, and the vehicle bodies are subjected to shocks of considerable magnitude.

The present invention is, accordingly, directed to the provision of a novel vehicle construction in which means are provided for controlling the relative lateral movement of the body and trucks, the control means being effective to overcome the several disadvantages of the prior constructions.

Broadly stated, the invention consists in the provision of means for controlling relative lateral movement between the vehicle body and its trucks, this means offering a progressively increasing resistance to continued lateral movement from the midposition and at the same time not impairing the freedom of vertical movement on the bolster springs.

Conveniently, the control means acts upon the truck bolster and the truck frame to resist relative movement therebetween, and preferably comprises a pair of springs, one at each side of the truck frame in the plane of the bolster, each with an actuating lever so associated with the bolster that any lateral movement in relation to the truck frame compresses one or other of the springs.

Advantageously as relative movement from the midposition proceeds, the resistance imposed by the springs increases rapidly and to this end, the aforementioned levers may be of the rolling fulcrum type so arranged that as the movement proceeds, the mechanical advantage progressively lessens say from approximately 10–1 to 1–1 with corresponding variation in the velocity ratio.

In one form of truck control apparatus constructed in accordance with the present invention, a rolling fulcrum lever adapted for movement in a vertical plane is mounted between each side of the truck bolster, suspended in the usual way on links, and the truck frame, and mounted in anti-friction bearings in the upper end of each lever is a roller which may be rubber covered and bears on a side face of the bolster. At its lower end, each lever is pivotally connected to a draw rod extending through an opening in the truck side frame, the rod carrying a spring acting at one end against an abutment on the rod and at the other against the truck side frame. With this arrangement, as the bolster moves laterally away from its central position, one of the levers is swung to compress its spring and, at the same time, the fulcrum of the lever shifts to reduce the mechanical advantage of the lever. The spring thus offers an increasing resistance to the lateral movement of the bolster by reason both of the shift in the fulcrum and of the compression of the spring. Return movement of the bolster may be cushioned by a suitable damping apparatus, such as a dashpot, if desired, which may be either single or double acting.

For a better understanding of the invention, reference may be had to the accompanying drawings, in which;

Fig. 4 is an end elevation of the control gear.

Figure 1:
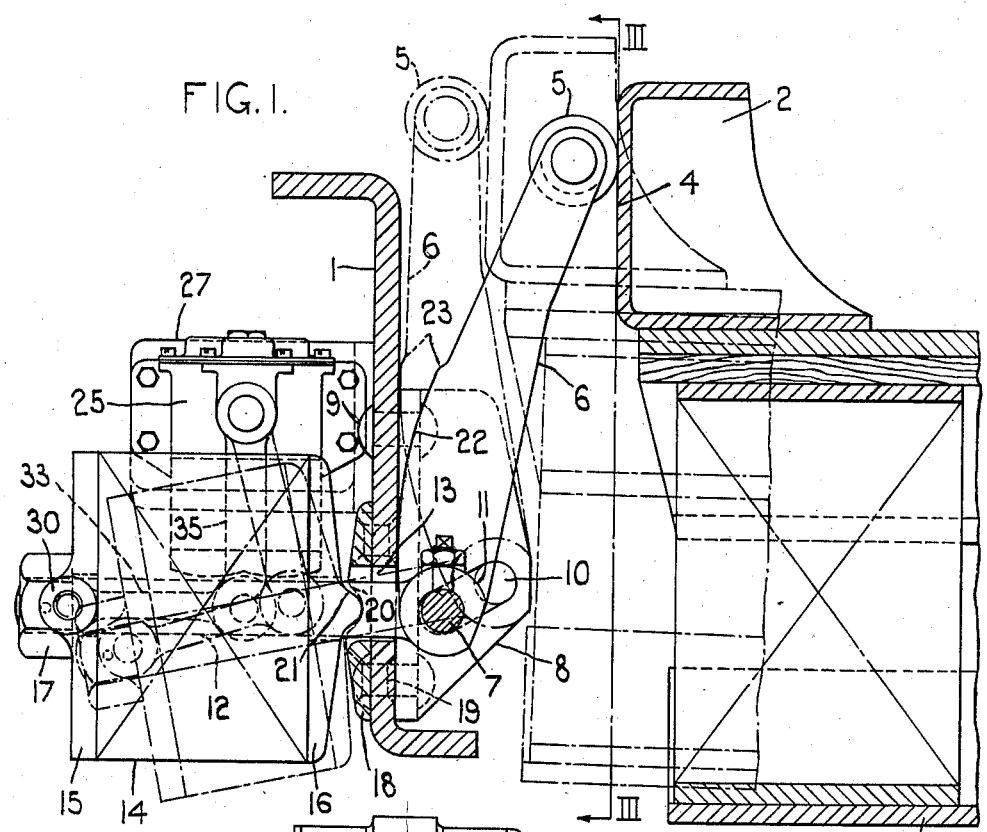
Fig. 1 is a cross-sectional view showing a portion of the truck bolster and of the control means.
Figure 3:
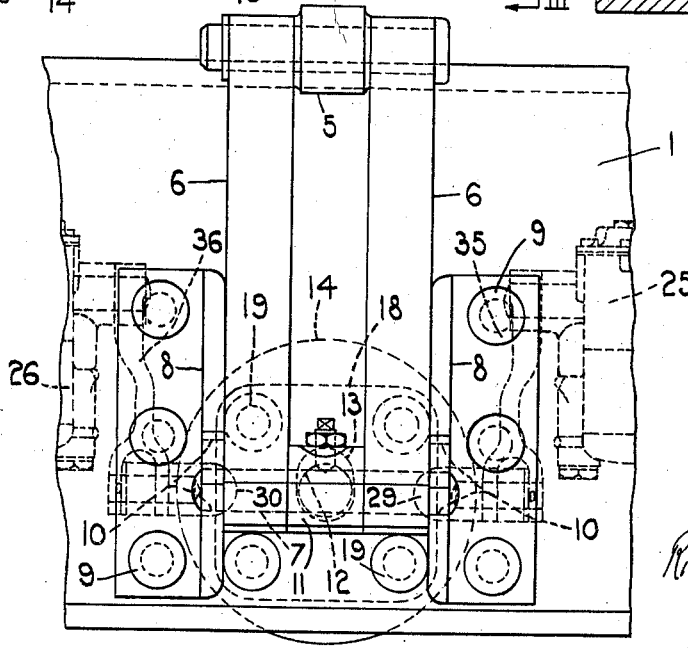
Fig. 3 is a sectional view on the line III—III of Fig. 1.

Referring now to the drawings, I generally indicates one main side member of the truck and 2 the bolster carried by the spring plank 3 which is in turn suspended by links (not shown) in the customary manner in the truck frame.

In the lateral plane of the bolster 2 and adapted to bear on the side wall 4 thereof is a roller 5 carried by a pair of duplicate rocking levers 6 mounted on a gudgeon pin 7 for pivotal movement in the vertical plane.

The rocking levers 6 are positioned between cheek plates 8 secured on the inside of the truck main frame I by bolts 9, the cheek plates 8 being slotted at 10 also to guide the gudgeon pin 7, such slots 10 being elongated and inclined for the purpose hereafter described.

Between the duplicate levers 6, the gudgeon pin 7 mounts the head 11 of a draw rod 12 which projects outwardly through an aperture 13 provided for the purpose in the truck side frame I and externally thereof carries a spring. In the construction illustrated, the spring is an india rubber spring generally designated 14 and comprising a plurality of units each consisting of a metal plate with rings or pads of india rubber projecting from each face and with intervening separating plates, this form of spring being well-known per se.

Mounted on the draw rod 12 at each end of the spring 14 are follower plates 15 and 16 respectively for the operation of the spring, the outer follower plate 15 being in abutment with a nut 17 on the end of the draw rod 12 and the inner follower plate 16 bearing on a wear plate or pad 18 secured at the outer surface of the truck frame 1 by bolts or rivets 19. The wear plate 18 is recessed at 20 to receive horizontally disposed inward projections 21 on the follower plate 16 so as to locate this latter member while permitting lateral movement of the draw rod 12 and its consequent inclination as determined by the path of the gudgeon pin 7 in the inclined slots 10 during lateral movement of the bolster 2 in relation to the main truck frame 1.

Reverting now to the duplicate rocking levers 6, it will be seen more especially in Fig. 1 that these are shown cranked inwardly somewhat, each being furnished with a cam surface 22 adapted to ride on the inner wall in the truck frame 1.

In the position shown in Fig. 1, which corresponds to the mid or central position of the truck bolster 2 in relation to the truck frame 1, that portion of the cam surface closely adjacent to the gudgeon pin 7 is in abutment with the inner wall of the truck frame 1 and constitutes the fulcrum of the levers 6 for any rocking thereof during the initial relative movement between the bolster 2 and the side frame 1, any such movement, as will be appreciated, retracting the draw rod 12 and thus causing compression of the spring 14. In this initial stage the mechanical advantage of the levers 6 is of the order 10 to 1.

Should the relative movement between the bolster 2 and truck frame be considerable, the form of the cam surfaces 22 is such that the effective fulcrum of the rocking levers 6, i. e., the portion in abutment with the inner surface of the truck frame 1 rises, thereby reducing the mechanical advantage of the levers until at about the termination 23 of the cam surface 22, the mechanical advantage is reduced to the order of about 1 to 1 with corresponding variation in the velocity ratio.

As a result of this arrangement, the progressively increasing resistance of the india rubber spring 14 to continued lateral movement of the bolster 2 from the mid position is multiplied by the progressive increase in the effective velocity ratio of the rocking levers 6 and satisfactory control of the bolster movement thereby effected.

The inclined slot 10 forming the guide for the gudgeon pin 7 at the lower end of the dual rocking levers fixes the effective fulcrum position along the cam surfaces 22 for each particular relative position between the bolster 2 and the truck frame 1 and as will be seen from the dotted showing in Fig. 1, the draw rod 12 moves from the horizontally projected position to the retracted inclined position, the follower plate 16 rocking about its centralising projection 21 and the recess 20 of the wear plate 18, which latter is cut away to permit this movement.

With the vehicle body central, i. e., with the bolster 2 in the mid-position shown in full lines in Fig. 1, the parts are in equilibrium, the centralising gear being effective to resist any lateral movement from this position and to return the bolster to its normal relationship with the truck frame 1.

In place of the rolling abutment 5, a pivot or link connection between the bolster and rocking levers 6 may be utilised, although the arrangement shown is preferred as it affords unrestricted movement in the vertical plane to cushion shocks due to inequalities in the permanent way.

Figure 2:
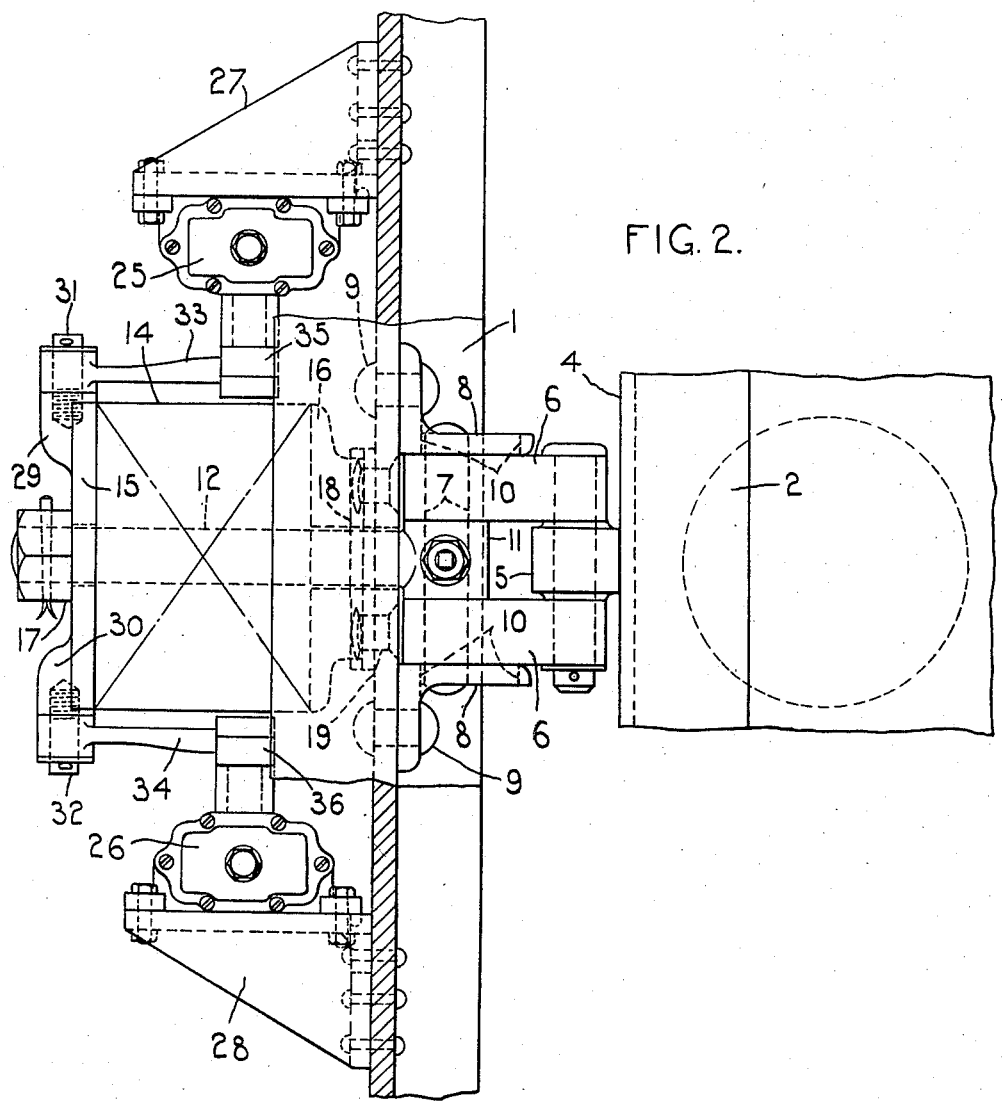
Fig. 2 is a plan view of the parts shown in Fig. 1.

In the embodiment illustrated, recoil damping apparatus is associated with the control gear and, as more clearly shown in Figs. 2 and 4, two double acting dashpots are furnished for each of the pair of springs 14.

The dashpots, which are designated 25 and 26, are disposed with their axes vertical outside the main sill being carried by angle brackets 27 and 28 riveted thereto. For actuating the dashpots the outer follower 15 of the spring 14 is furnished with lateral lugs 29 and 30 carrying wrist pins 31 and 32 connected by links 33, 34 to operating arms 35, 36 of the respective dashpots 25, 26 in such manner that the arms 35, 36 participate in the movement of the follower taking place on compression of the spring 14 when the bolster 2 moves from its mid position. The dashpots 25 and 26 are double-acting, and impose a resistance to movement in both directions although, as will be understood, single acting devices imposing a resistance only to the return movement under recoil can be utilised if desired.

It will be appreciated that although in the particular embodiment described the lever control means are interposed between the truck bolster and the truck frame, the invention is not limited in this respect since corresponding provision may be made between some part of the vehicle underframe and the truck with the same advantageous results. Moreover, bar type india-rubber springs of the type described in the United States Patent No. 2,032,100 issued to Alexander Spencer on February 25, 1936, may be used or a combination of steel and india-rubber springs or steel springs alone.

By the present invention improved arrangements for mounting the trucks of truck vehicles are obtained giving improved riding comfort owing to the reduction of lateral sway and prolonging the life of the vehicle by cushioning the shocks encountered during running.

What I claim is:

1. In a vehicle having a truck, a body-supporting bolster, and a spring plank supporting the bolster and suspended from the truck frame, the bolster and spring plank being movable laterally relative to the truck from a central position, a device for controlling said lateral movement outwardly in one direction comprising a spring disposed outside the truck frame, followers at the ends of the spring, a wear plate on the truck frame, the inner follower and wear plate having interengaging parts permitting rocking movement of the follower, a pair of cheek plates on the inner side of the truck frame, a lever mounted between the plates and having one end bearing against the bolster, the lever having fulcrum engagement with the truck frame and being mounted to permit movement of the fulcrum point as the lever swings, and a rod connecting the outer follower and the other end of the lever.

2. In a vehicle having a truck, a body-supporting bolster, and a spring plank supporting the bolster and suspended from the truck frame, the bolster and spring plank being movable laterally relative to the truck from a central position, means for controlling said lateral movements comprising a pair of devices at opposite sides of the truck, each device including a spring acting at one end on a part of the truck, a lever mounted on the truck and having a movable fulcrum, one end of the lever bearing against the bolster, means connecting the other end of the lever with the other end of the spring, and means for retarding the return movements of the levers when they have been swung by a shift of the bolster from its central position.

3. In a vehicle having a truck, a body-supporting bolster supported by the truck, the bolster being movable laterally from a central position relative to the truck, means for controlling the lateral movements of the bolster comprising spring gears mounted outside the truck frame on opposite sides thereof, a lever associated with each spring gear and operable by the bolster on lateral movement thereof to compress its gear, the lever having a movable fulcrum effective to increase the resistance offered by the gear as the lateral movement proceeds, and recoil damping means including dashpots mounted on the truck frame and imposing resistance to the return movement of the gears to their normal mid-positions.

4. In a vehicle having a truck and a body-supporting bolster supported by the truck and movable laterally relative thereto from a central position, means for controlling the lateral movements of the bolster comprising a spring mounted on a seat outside the truck frame, a lever mounted on the truck frame to swing in a vertical plane and having a fulcrum in contact with the frame which shifts as the lever is swung and also having an end engaged by the bolster, and a connection between the other end of the lever and the spring, the swinging of the lever by the bolster in its outward movement acting through the connection to compress the spring and the spring resisting compression with increasing effectiveness as the fulcrum of the lever shifts during such movement of the bolster.

5. In a vehicle having a truck and a body-supporting bolster supported by the truck and movable laterally relative thereto from a central position, means for controlling the lateral movements of the bolster comprising a spring mounted on a seat outside the truck frame, a lever mounted inside the truck frame to swing in a vertical plane and having a fulcrum in contact with the frame which shifts as the lever is swung and also having an end engaged by the bolster, and a connection extending through an opening in the frame and between the other end of the lever and the spring, the swinging of the lever by the bolster in its outward movement acting through the connection to compress the spring, the effectiveness of the spring increasing as the fulcrum of the lever shifts during such movement of the bolster.

6. In a vehicle having a truck and a body-supporting bolster supported by the truck and movable laterally relative thereto from a central position, means for controlling the lateral movements of the bolster comprising a spring having a seat on the truck frame, a lever mounted on the truck frame to swing in a vertical plane, the lever and spring being on opposite sides of the frame member on which they are mounted and the lever having a fulcrum which shifts as the lever is swung and an end engaged by the bolster, and a connection between the other end of the lever and the spring, the swinging of the lever by the bolster in the outward movement of the latter acting through the connection to compress the spring, the effectiveness of the spring increasing as the fulcrum shifts during such movement of the bolster.

7. In a vehicle having a truck and a body-supporting bolster supported by the truck and movable laterally relative thereto from a central position, means for controlling the lateral movements of the bolster comprising a spring having a seat on the truck frame, a lever mounted on the truck frame to swing in a vertical plane, the lever and spring being on opposite sides of the frame member on which they are mounted and the lever having a fulcrum which shifts as the lever is swung and anti-friction means at one end of the lever engaged by the bolster, and a connection between the other end of the lever and the spring, the swinging of the lever by the bolster in the outward movement of the latter acting through the connection to compress the spring, the effectiveness of the spring increasing as the fulcrum of the lever shifts during said movement.

8. In a vehicle having a truck and a body-supporting bolster supported by the truck and movable laterally relative thereto from a central position, means for controlling the lateral movements of the bolster comprising a spring having a seat on the truck frame, slotted extensions from the frame, a lever disposed between the extensions and having gudgeons within the slots therein, the lever being mounted to swing in a vertical plane and having a fulcrum on the frame which shifts as the lever is swung and an end engaged by the bolster, and a connection between the other end of the lever and the spring, the swinging of the lever by the bolster in the outward movement of the latter acting through the connection to compress the spring, the effectiveness of the spring increasing as the fulcrum of the lever shifts during said movement.

9. In a vehicle having a truck and a body-supporting bolster supported by the truck and movable laterally relative thereto from a central position, means for controlling the lateral movements of the bolster comprising a spring having a seat outside the truck frame, a lever mounted on the frame to swing in a vertical plane and having a fulcrum in contact with the frame which shifts as the lever is swung and also having an end engaged by the bolster, a connection between the other end of the lever and the spring, the swinging of the lever by the bolster in the outward movement of the latter acting through the connection to compress the spring, the effectiveness of the spring increasing as the fulcrum of the lever shifts during said movement, and means acting through said connection to damp the recoil of the spring.

RICHARD THOMSON GLASCODINE.